Patented June 27, 1933

1,915,979

UNITED STATES PATENT OFFICE

ADRIEN CAMBRON, OF PERTH AMBOY, NEW JERSEY, ASSIGNOR, BY MESNE ASSIGN-MENTS, TO E. I. DU PONT DE NEMOURS AND COMPANY, A CORPORATION OF DELAWARE

ACCELERATOR FOR THE VULCANIZATION OF RUBBER

No Drawing.   Application filed June 4, 1929.  Serial No. 368,425.

This invention relates to the vulcanization of rubber and has for its particular object the provision of a new substance which will give improved results in the acceleration of vulcanization, the process of vulcanization utilizing this new accelerator, and the vulcanized rubber product thereby produced.

The new material employed as an accelerator in this invention comprises an improved product formed by the condensation of normal butyl aldehyde with aniline in the presence of an acidic catalyst and includes a process of treating rubber or similar material with this improved condensation product and vulcanizing the rubber. This application is a continuation in part of my application S. N. 82,613, filed January 20, 1926.

The condensation products of aldehydes and aromatic amines have been used in various forms for some time as accelerators in the art of vulcanizing rubber. These substances vary greatly in nature and activity due to the varying methods of formation and to the different ratios of aldehyde and amine employed. Many of these substances are of an undesirable soft pitchy nature, being neither hard materials nor free flowing liquids. This soft and sticky material is difficult to handle; some of the so-called hard products are unsuitable in many cases since the ground particles agglomerate on standing. A suggested improvement is a secondary treatment of these semi-soft materials with a further aldehyde addition after the primary condensation has been effected.

I have discovered a new process of preparing improved butyl aldehyde-aniline condensation products. I have found that it is possible to obtain a free flowing liquid product suitable for use as an accelerator for vulcanization by condensing butyl aldehyde and aniline in the presence of acidic catalysts. This new product will remain liquid and free flowing under all ordinary circumstances; thus it is not subject to the difficulties when incorporating into the rubber as are attendant upon the use of the semi solid materials above referred to. My product has excellent accelerating properties in the vulcanization of rubber and extends the life of the rubber article in which it is used.

Preferably I use small amounts of an acid zinc salt, such as zinc chloride, as the catalyst, or I may use zinc chloride first to secure a primary condensation and finally a mineral acid, such as hydrochloric acid, to complete the condensation. I have also used hydrochloric acid alone but then the condensation reaction is quite violent and the mass tends to boil up due to the steam liberated by the heat of the reaction. I have secured similar results with other acidic material, of which sulphuric acid, dinitro-chlorbenzol and aluminum chloride are examples. The salts used are acidic, i. e. they would give an acid reaction if in a water solution.

It is generally recognized in the rubber art that the presence of appreciable amounts of acid in the rubber will retard vulcanization. The accelerators prepared by my process though made with acid catalysts do not add an appreciable acidity to the rubber. First, because such small amounts of accelerator are used in proportion to the rubber and secondly, because only small amounts of acid catalysts are required in the condensation to form the accelerator. I am aware that it has previously been proposed to prepare various rubber compounding materials such as age resistors, accelerators and conditioners from aldehydes and amines in aqueous acid solutions. In these, however, relatively large amounts of acid are present and this not only alters the course of the reaction and produces a different type of product but also serves, with the large amount of water, to dissolve out certain constituents of the mix. The product of this type of high acid reaction requires neutralization with alkalies and/or other treatment such as waterwashing to render it suitable for use in rubber. My products, on the other hand, are prepared from substantially anhydrous materials with no solvent and do not require neutralization. Further I use only very small amount of acid catalyst, less than 5% by weight of the reaction product in all cases. My product is characterized in that it retains in its finished state all of the acidic material added to catalyze the condensation reaction.

In preparing the rubber accelerator of this invention I preferably use $ZnCl_2$ alone as a condensing agent. The aniline is placed in a jacketed kettle equipped with an agitator and cooling water circulated in the jacket. The requisite amount of zinc chloride is added to the amine with agitation to prevent settling out of the zinc chloride-amine addition product which forms. Butyl aldehyde is now run into the amine-catalyst mixture. The rate of addition is regulated in accordance with the temperature rise in the reacting mass. The heat of the reaction is utilized as fully as possible to carry the reaction to completion; this is accomplished by shutting off the cooling water in the jacket as soon as danger of violent primary reaction is passed; this is indicated by the temperature of the reaction mass.

I have at times formed the zinc chloride-amine addition product apart from the main reaction mass. In this case I take equivalent amounts of the amine and zinc chloride and agitate them together until the addition is complete. Suitable amounts of this addition product are then added to the amine to be condensed. Obviously the result is the same and the choice is only a matter of convenience. I have also formed the accelerator of this invention by adding the zinc chloride-aniline product to the aldehyde in the kettle and then adding the aniline to the aldehyde.

Usually the heat of the reaction is not sufficient to complete the condensation, and I introduce steam into the kettle jacket to keep up the final temperature until tests indicate that the desired condensation has been attained. Observation of color or previous experience with prior batches will indicate the length of time that it is necessary to maintain a definite elevated temperature to complete the reaction. If subsequent condensation or assistance to the condensation is required, I preferably add a small amount of concentrated HCl.

For specific examples of the method of forming my accelerator the following are given:

*Example I*

|  | Grams |
|---|---|
| Butyl aldehyde | 216 |
| Aniline | 140 |
| $ZnCl_2$-aniline | 0.7 |
| HCl (in 25% aqueous solution) | 1.1 |

The $ZnCl_2$ was added to the amine in a jacketed kettle and the aldehyde run in slowly, with stirring and cooling; temperature was maintained between 50°–60° C. After the aldehyde was all in and the evolution of heat had slowed, the HCl was added and the temperature allowed to rise; this rise was to 100° C. or over; finally, most of the water formed by the reaction was distilled off by holding the mass slightly above 100° C. by means of steam in the kettle jacket. The material was then drawn off as a reddish yellow liquid. Some of the butyl aldehyde was lost by condensation with itself to form ethyl-propyl acrolein, some of which is removed with the water of reaction.

This liquid condensation product was used as an accelerator in rubber formula as follows:

|  | Parts by weight |
|---|---|
| Smoked sheet | 100 |
| Zinc oxide | 5 |
| Sulphur | 5 |
| Accelerator | 1 |

These ingredients were properly mixed on a rubber mill and the mixture cured for 30 minutes at the temperature of 40 lbs. steam in a rubber press; a tensile strength of 3193 pounds per square inch was obtained with an elongation of 9.7.

*Example II*

|  | Grams |
|---|---|
| 93% butyl aldehyde | 464.4 |
| Aniline | 186.0 |
| $ZnCl_2$-aniline | 0.6 |

The zinc chloride-aniline addition product was first prepared as described above and then the 0.6 parts of this was dissolved in the aldehyde; the aniline was added gradually to this solution while maintaining at a maximum temperature of 60° by cooling or heating by means of the kettle jacket as was required. The mixture was now heated at 65° for 3 hrs. then at 100–105° for 2 hrs. in a closed vessel. The water formed in the reaction was then distilled off through the opened kettle vent by gradually raising the temperature of the charge to 126°; following this the finished product was drawn off; this product was a reddish yellow oil. During this distillation, or water removal, some of the ethyl-propyl-acrolein, formed by the condensation of the aldehyde with itself, is also removed. Ordinarily about 10% of the aldehyde is lost in this operation. I have discovered by distillation with vacuum, for as complete removal as possible, that the total acrolein formation corresponds to about 30% of the total aldehyde used. The exact amount of acrolein derivative formed will, of course, depend upon the molecular excess of butyl aldehyde used at the start, and I cannot exactly define the amount formed. However, in my preferred product, actually the aldehyde-aniline condensation product appears to have utilized approximately 2 moles butylaldehyde to one of aniline. The acrolein derivative not removed of course remains in the final accelerator.

The material obtained by reacting 3 moles of butyl aldehyde with 1 mole aniline above described was used as the accelerator in rubber formulæ with the results as described below:

| | |
|---|---|
| Smoked sheet | 100 |
| Blanc fixe | 30 |
| Zinc oxide | 3.5 |
| Sulphur | 2.5 |
| Iron oxide | 3 |
| Stearic acid | 1 |
| Accelerator | 0.5 |

The above ingredients were properly mixed on the rubber mill and the mixture cured for 8 minutes at a temperature of steam at 60 pounds pressure (307° F.). The vulcanized rubber thus obtained gave a tensile strength at break of 2930 pounds per square inch with 760% elongation; the load at 600% elongation was 1200 pounds.

| | |
|---|---|
| Smoked sheet | 100 |
| Zinc oxide | 5 |
| Sulfur | 4 |
| Accelerator | 0.5 |

This composition was milled and then cured for 15 minutes at a temperature of 40 pounds steam (287° F.) and gave a rubber which had a tensile of 3320 pounds per square inch at break with a 780% elongation and a load of 1200 pounds per square inch at 600% elongation.

The materials cited above as catalysts, namely, $ZnCl_2$, HCl, $H_2SO_4$, $\phi(NO_2)_2Cl$, $AlCl_3$ are not by any means the only materials which give excellent results according to the procedure described, but are given as examples of the wide diversity of acidic materials which when used in the proportions specified in aldehyde amine condensation reactions and in the substantial absence of water, catalyze the formation of my accelerators which are also anti-oxidants.

Whether the catalytic effect shown in my experiments is due to the acidic substances per se, or, to the addition products of these acidic substances with the amines or other chemicals is immaterial as influencing the scope of this invention. Nor do I wish to be limited to any exact proportions of catalyst or reacting components given above. The use of the acidic catalysts in preparing resin type accelerators admits of the widest application.

The amount of my new accelerator necessary to be incorporated into the rubber will in general be less than about 3% of the weight of rubber used and more than 0.3%. Within these ranges excellent tensile strengths are obtained with other good qualities in the rubber. Less than this amount will be insufficient to effect vulcanization in a desirable length of time, and more than this while effecting a cure, will be unnecessary for maximum beneficial results.

I claim:

1. Process for treating rubber or similar material which comprises combining with an unvulcanized rubber compound a vulcanizing agent and the product obtained by reacting aniline and butyl aldehyde under essentially anhydrous conditions and in the presence of less than 5% by weight of an acidic material.

2. Process for treating rubber or similar material which comprises combining with an unvulcanized rubber compound a vulcanizing agent and the product obtained by reacting aniline and butyl aldehyde under essentially anhydrous conditions and in the presence of less than 5% by weight of zinc chloride.

3. Process for treating rubber or similar material which comprises combining with an unvulcanized rubber compound a vulcanizing agent and between 0.3% and 3.0% by weight, calculated on the weight of the rubber in the compound, of the product obtained by reacting aniline and butyl aldehyde under essentially anhydrous conditions and in the presence of less than 5% by weight of zinc chloride.

4. A vulcanized rubber derived from unvulcanized rubber or similar material by combining it with a vulcanizing agent and the product obtained by reacting aniline and butyl aldehyde under essentially anhydrous conditions and in the presence of less than 5% by weight of zinc chloride.

5. A vulcanized rubber derived from unvulcanized rubber or similar material by combining it with a vulcanizing agent and the product obtained by reacting aniline and butyl aldehyde under essentially anhydrous conditions and in the presence of less than 5% by weight of an acid material.

Signed at Perth Amboy, in the county of Middlesex and State of New Jersey this 31 day of May A. D. 1929.

ADRIEN CAMBRON.